United States Patent [19]

Christopher, Jr. et al.

[11] Patent Number: 5,008,820

[45] Date of Patent: Apr. 16, 1991

[54] METHOD OF RAPIDLY OPENING DISK FILES IDENTIFIED BY PATH NAMES

[75] Inventors: Kenneth W. Christopher, Jr., Lighthouse Point; Barry A. Feigenbaum; Jin Kim, both of Boca Raton; Douglas C. Love, Delray Beach, all of Fla.

[73] Assignee: International Business Machines Corporation, Armonk, N.Y.

[21] Appl. No.: 32,210

[22] Filed: Mar. 30, 1987

[51] Int. Cl.$^5$ .................... G06F 12/02; G06F 15/40
[52] U.S. Cl. ................... 364/200; 364/283.1; 364/282.3; 364/251.5; 364/243.41; 364/236.2; 369/32
[58] Field of Search ... 364/200 MS File, 900 MS File; 369/32

[56] References Cited

U.S. PATENT DOCUMENTS

| | | | |
|---|---|---|---|
| 3,905,023 | 9/1975 | Perpiglia | 364/200 |
| 4,186,438 | 1/1980 | Benson et al. | 364/200 |
| 4,215,402 | 7/1980 | Mitchell et al. | 364/200 |
| 4,277,826 | 7/1981 | Collins et al. | 364/200 |
| 4,489,378 | 12/1984 | Dixon et al. | 364/200 |
| 4,530,055 | 7/1985 | Hamstra et al. | 364/200 |
| 4,533,995 | 8/1985 | Christian et al. | 364/200 |
| 4,571,674 | 2/1986 | Hartung | 364/200 |
| 4,593,354 | 6/1986 | Ushiro | 364/200 |
| 4,598,357 | 7/1986 | Swenson et al. | 364/200 |
| 4,603,380 | 7/1986 | Easton et al. | 364/200 |
| 4,761,737 | 8/1988 | Duvall et al. | 364/300 |
| 4,779,189 | 10/1988 | Legvold et al. | 364/200 |
| 4,827,462 | 5/1989 | Flannagan et al. | 369/32 |
| 4,835,686 | 5/1989 | Furuya et al. | 364/200 |

FOREIGN PATENT DOCUMENTS 0117906 11/1983 European Pat. Off. .
0129061 5/1984 European Pat. Off. .

OTHER PUBLICATIONS

Software Practice & Experience, vol. 16, No. 12, 12/86, pp. 1059-1076, J. Wiley & Sons, Ltd., "A Modular Operating System for the CRAY-1".
Patent Abstracts of Japan, vol. 10, No. 387, 12/25/86, p. 530, JP-A-61 175 838, Ricoh Co., Ltd.
Patent Abstracts of Japan, vol. 10, No. 132, 05/16/86, p. 456, JP-A-60 254 325, Fujitsu K. K.
Patent Abstracts of Japan, vol. 8, No. 86, 04/19/84, p. 269, JP-A-59 752, Fujitsu K. K.
Patent Abstracts of Japan, vol. 11, No. 66, 02/27/87, p. 552, JP-A-61 228 538, NEC Corp.
IBM Technical Disclosure Bulletin, vol. 21, No. 9, 02/79, p. 3809, L. R. Walker, "File Control Entry Cache".
Patent Abstracts of Japan, vol. 11, No. 129, 04/23/87, p. 570, JP-A-61 271 547, Mitsubishi Electric Corp.
IBM Technical Disclosure Bulletin, Efficient Storage Space Utilization, J. M. Gibbard and L. R. Walker, vol. 21, No. 9, Feb. 1979.

Primary Examiner—Gareth D. Shaw
Assistant Examiner—Maria Napiorkowski
Attorney, Agent, or Firm—Anibal Jose Cortina; Douglas R. McKechnie

[57] ABSTRACT

A data processing system has files stored on disks in a tree structure of directories and files. The system is operated to rapidly open files which have been recently opened or for which partial path information is available, by accessing a drive cache in main memory. The cache has entries chained in a tree structure which is then searched to provide the same information during the opening process as that information which would otherwise have to be gotten from a disk. When the cache is full, a new entry replaces the least recently used entry.

10 Claims, 8 Drawing Sheets

METHOD OF RAPIDLY OPENING DISK FILES IDENTIFIED BY PATH NAMES

This invention relates to the field of data processing and, more particularly, to a method of rapidly opening disk files that are identified by path names.

BACKGROUND OF THE INVENTION

The invention was designed as an improvement over a well known, commercially available system of the type in which hardware, such as an IBM Personal Computer, is operated under a disk operating system (DOS) and in which files are stored on fixed disks using tree structured directories and path names. Information is stored on a disk according to a predetermined pattern of cylinders and sectors, each sector containing a predetermined number of bytes. In order to access a desired sector, a head must first be moved to the cylinder containing the desired sector, the disk rotated past the head until the desired sector is reached and then the sector is read and the contents placed in a buffer. In looking at the total amount of time required to access data on a disk, the principal delay occurs during physical movement of a head. Where an application requires a large amount of physical I/O activity, it is desirable to reduce as much as possible the degree of head movement.

Files are stored on the disk in a cluster or clusters of sectors, each cluster having a predetermined number of sectors. Each cluster has a unique different starting address. The locations of files on a disk are kept track of by means of a file allocation table (FAT) which itself is stored on the disk. Each position of the FAT is associated with a different cluster and contains an entry indicating there are no other clusters associated with a file or pointing to the next cluster of the file. Small files are contained in a single cluster. Long files are contained in clusters that are chained together.

Files are located through the use of tree structured directories. Each disk contains a root directory, many sub-directories and a multiplicity of files. A given file may be at the end of a path passing through the root directory and several sub-directories. Each directory contains entries for additional directories and files. A specific file may be identified by specifying the drive, path and filename. For example, C:/DIR1/DIR2/FILE1 identifies a filename FILE1 that is listed in directory DIR2, which is a sub-directory of DIR1 and listed therein, DIR1 being a sub-directory of the root directory, and listed therein, of drive C.

When a file is opened, it is necessary to access the drive and search through all of the directories specified in the path to locate the directory containing the entry of the filename. In such latter directory, all of the entries and filenames are searched until the desired one is located. If a file has not been previously opened, there will be no entry and therefore entries will have to be made before the file can be used. If the file has been previously opened, then the entry in the directory in which the filename is listed, contains an entry that is an index into the FAT that corresponds to the cluster where the file begins. During such open procedure, physical I/O activity must occur to access the root directory, each sub-directory and to search through a long list of filenames. In some applications, the same files are opened many times during the course of running a given program and because each opening involves a large amount of physical I/O activity, a relatively large amount of time can be lost. The invention is designed to improve upon the prior art method of opening by providing a method that rapidly opens files and reducing the amount of physical I/O activity associated with the opening process.

SUMMARY OF THE INVENTION

One of the objects of the invention is to provide a method for rapidly opening a file after such file has been initially opened at least once.

Another object is to provide a method for rapidly opening files in a high performance personal computing system in a manner that reduces the amount of physical I/O activity associated with such procedures.

Still another object is to reduce the time required to open a file by eliminating the necessity of searching through the directories of a disk drive and through various filenames that would otherwise be required, in order to locate the filename entry in a directory, once the file has been opened previously.

Another object is to provide a method for rapidly reopening files that have been recently accessed and nested files that are opened and closed frequently.

Briefly, the manner in which this is done is to create and maintain in a cache in main memory a history of file usages. Each time a directory or file is to be accessed, the history is checked and if the information required for opening is in the cache, it is used directly without the need for further tree searching for any directory or filename that might involve physical I/O activity. By maintaining a cache in main memory, such information is accessed at the high speeds of main memory and does not involve the lower speeds associated with disk physical I/O activity.

DRAWINGS

Other objects and advantages of the invention will be apparent from following description taken in connection with the accompanying drawings wherein.

Figure 1:
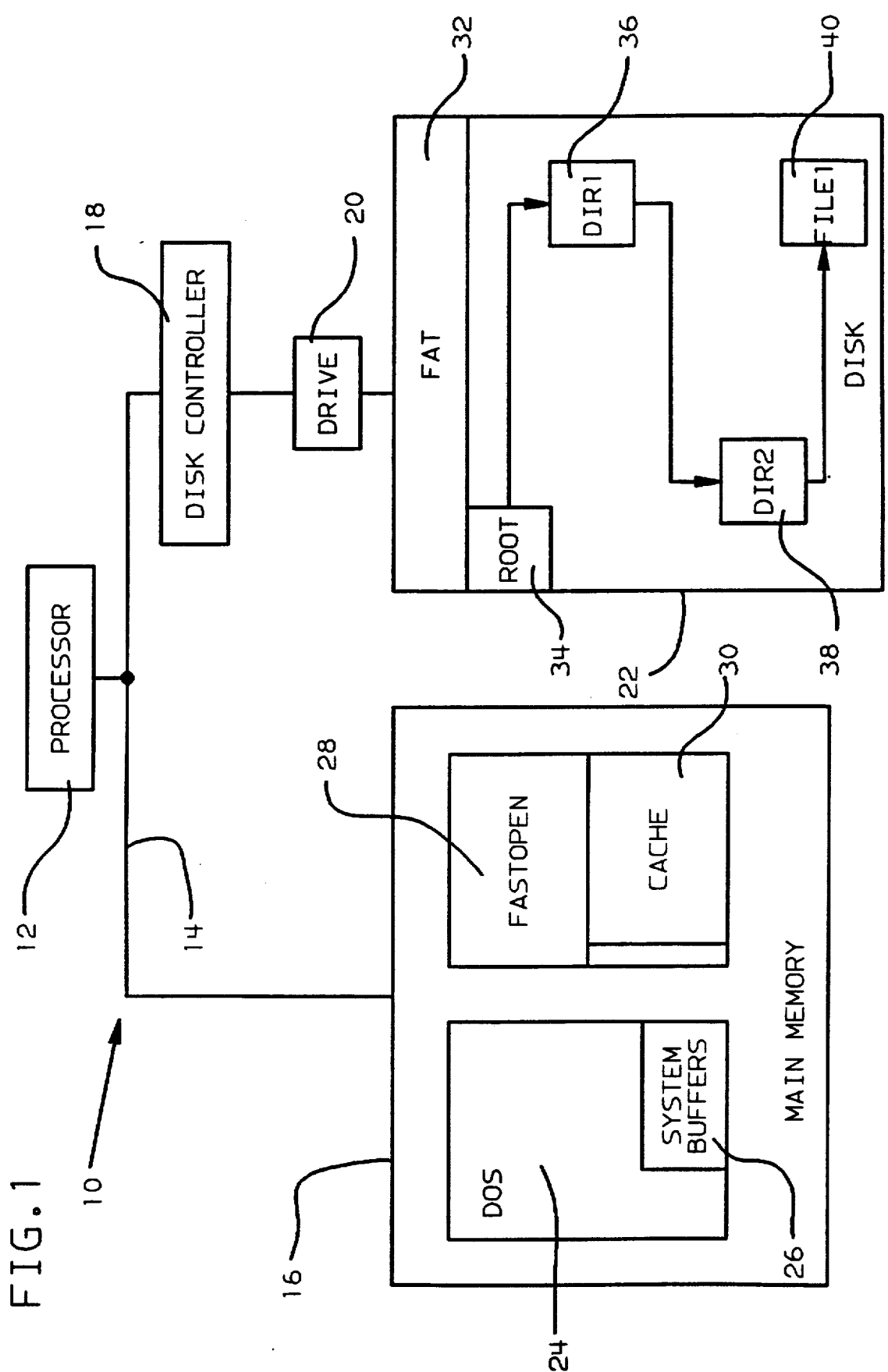
FIG. 1 is a schematic diagram generally illustrating the relationship of the invention to the environment or prior art in which the method is carried out.

Referring now to the drawings, and first to FIG. 1, a data processing system 10, such as an IBM Personal Computer AT, includes a processor 12 connected over a bus 14 to a main memory 16 and disk controller 18. The controller in turn is connected to a disk drive 20 which contains a disk 22 having a conventional storage media thereon into which bits of information are recorded. During operation of system 10, DOS procedures 24 are loaded or resident in main memory 16 and are primarily used to control access to information on disk 22. DOS is associated with system buffers 26 into which or through which information is transferred between disk 22 and main memory 16 in conventional fashion.

Also loaded into and resident in main memory 16 are a set of procedures named FASTOPEN 28 that are associated with the operation of a FASTOPEN cache 30, the details of the procedures being described hereinafter. If there is more than one drive in the system, there will be a number of caches 30 one for each drive. The disk itself 22 is formatted so as to contain a file allocation table (FAT) 32, and root directory 34. Also illustrated in FIG. 1 is an exemplary file structure in which file 40 named FILE1 is located in sub-directory 38 named DIR2, which itself is a sub-directory of subdirectory 36 named DIR1 which is a sub-directory of root directory 34. Without FASTOPEN procedures 28 installed, the system operates in conventional well known fashion. FASTOPEN 28 is installed by initializing various variables described below and thereafter terminating but staying resident within main memory 16 to be available for use as needed.

As indicated previously, there is one cache 30 for each disk drive in the system. Each cache contains a block of information known as the drive cache header. Such header contains various fields whose meaning is set forth in Table 1.

TABLE 1

| Field | DRIVE CACHE HEADER Meaning |
|---|---|
| 1 | Header of LRU chain of this drive |
| 2 | Offset to last entry of LRU chain |
| 3 | Pointer to first child in entry chain |
| 4 | Pointer to next drive cache header |
| 5 | Drive ID |

Also located in each cache 30 will be a number of directory and file entries each containing the fields of information listed in Table 2. These entries form a chained data structure, that is more fully described below. The size of cache 30 will be determined by the desired number of entries which number can be chosen through a system default value or by the user selecting the number of entries. Normally the number selected by the user should be larger than the deepest nesting of path entries in the drive.

TABLE 2

| Field | ENTRY Meaning |
|---|---|
| 1 | Pointer to next LRU entry |
| 2 | Pointer to next MRU entry |
| 3 | Pointer to child |
| 4 | Pointer to sibling |
| 5 | Pointer to preceding node |
| 6 | Directory/file information |

As will be appreciated, the entries are maintained in a chain in such a manner that when cache 30 is full of entries, and a new entry needs to be added, the new entry will replace the least recently used (LRU) entry in the cache. Thus fields 1 and 2 are used to chain the entries in accordance with the LRU, MRU (most recently used) concept. An entry is added for each file that has been opened and for each sub-directory included in the path to such file. Two files or directories or combinations thereof in the same sub-directory are considered to be at equal levels and are called "siblings". Any entry that is a sub-directory of another or a file is called a "child". For search purposes, the entries in the cache are arranged in a tree structure through the pointer fields 3-5. Field 6 contains that information that is associated with the normal directory entry contained on the disk media except that this information is inserted into field 6 of the name entry and therefore is resident in main memory. Such information can therefore be rapidly accessed when it is necessary to open a file for which there is a corresponding entry in cache 30. The information for a file is filename and extension, attributes, time of last write, date of last write, first cluster in file, and file size.

Figure 2:
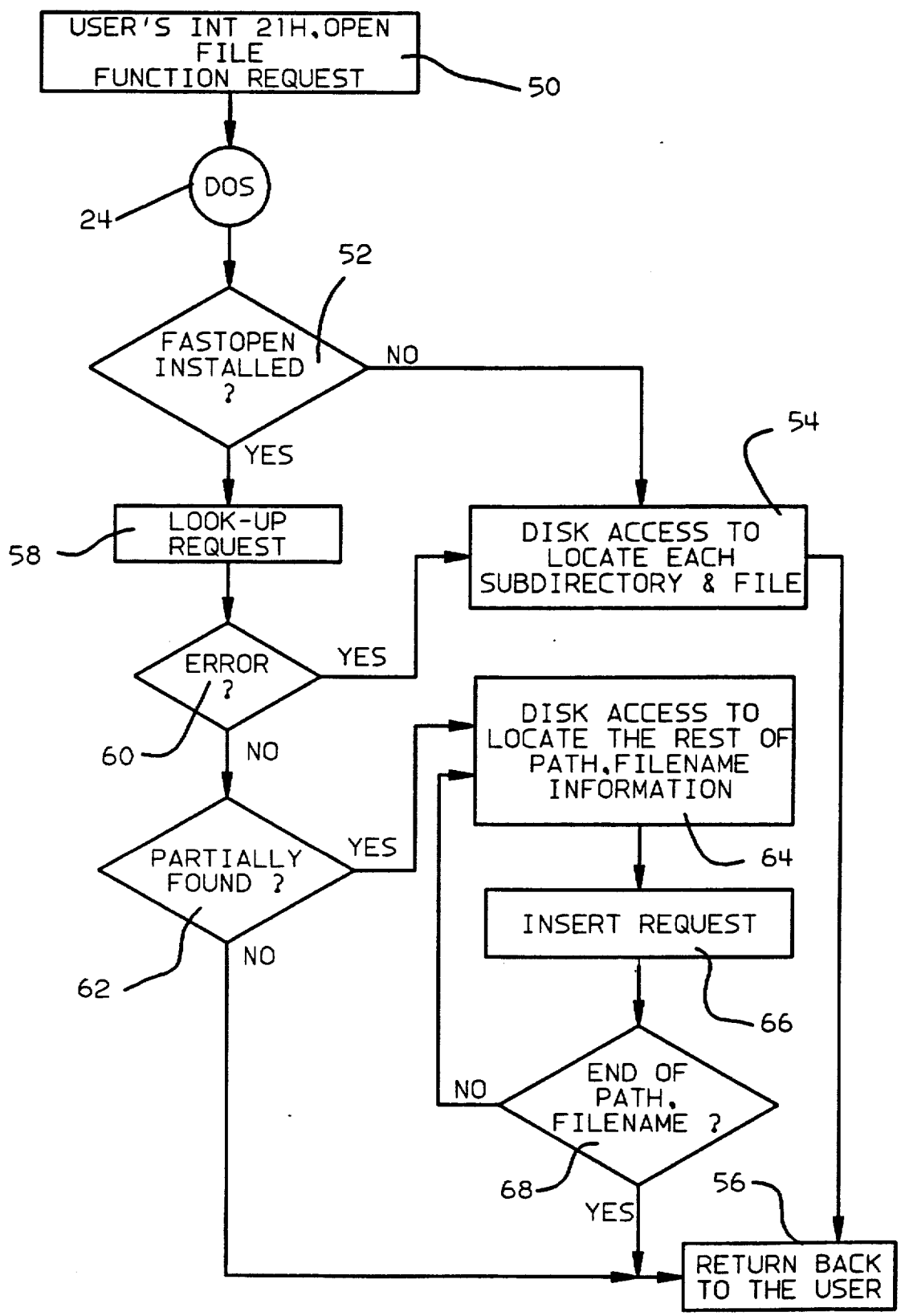
FIG. 2 is a flow chart of general steps of the invention that occur in response to a user's request.

Referring now to FIG. 2, when the application or user program wants to open a file, the known DOS call (interrupt 21Hex for opening a file) 50 is used. Such call goes to DOS 24 and FASTOPEN, as previously indicated, is installed so as to intercept such interrupt and act on it. The first decision of course is to determine whether or not FASTOPEN has been installed and this is done in step 52. If it has not, then the procedure advances in accordance with the prior art step 54 of accessing the disk to locate each sub-directory and file in the normal manner after which step 56 returns back to the user or application. If FASTOPEN is installed, then step 58 looks up the request in a manner to be described in more detail hereafter. If there was an error that may have occurred during the process, step 60 then branches to 54 and the process proceeds in accordance with the prior art process. If there was no error, step 62 then determines whether the path was partially found or conversely, if it was wholly found. If it was not partially found, i.e., the whole path and filename were found, then the same information as is provided by step 54 is then returned by step 56 back to the user. If the information was only partially found, then step 64, starting from the point of what information has been found, then proceeds to access the disk to locate the remaining portions of the path and filename. Each portion is inserted in step 66 and step 68 causes the process to be repeated from step 64 until the end of the path or filename has been reached, at which time the appropriate information is returned to the user.

Figure 3:
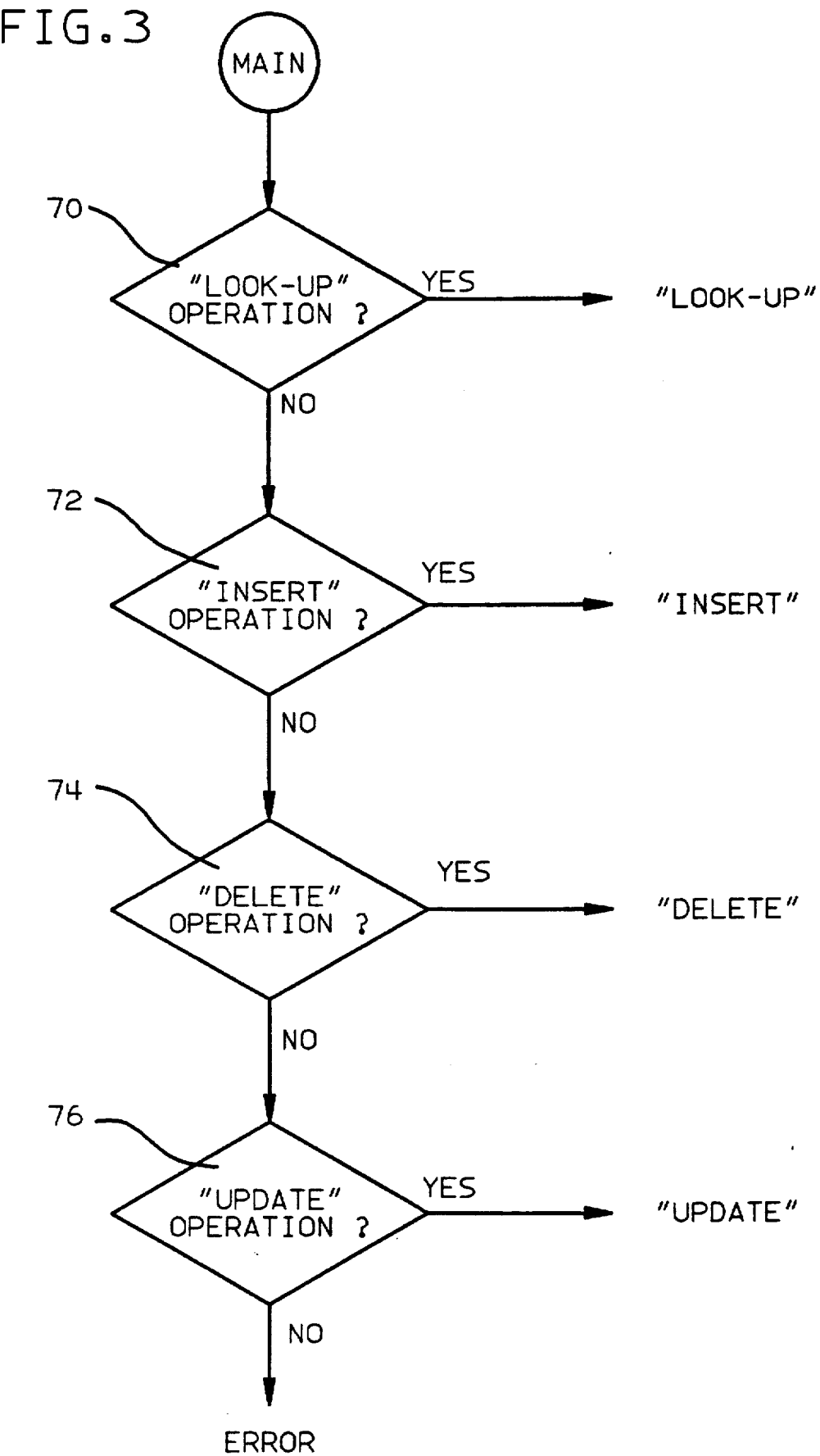
FIG. 3 is a flow chart for the selection from the main procedures of various details procedures.

Referring to FIG. 3, the central part of the procedure is known as "main" and it is used to decide which of four sub-procedures are to be used. The sub-procedures being known as "look-up", "insert", "delete", and "update", respectively. These different procedures might for example be invoked by inserting a different numeral corresponding thereto in one of the processor registers. In any event, step 70 decides if it is a look-up operation, step 72, 74 and 76 similarly decide whether it is an insert, delete or update operation respectively. If none of these operations are invoked, then an error signal is returned. These various sub-procedures will now be described relative to their separate figures.

Figure 4:
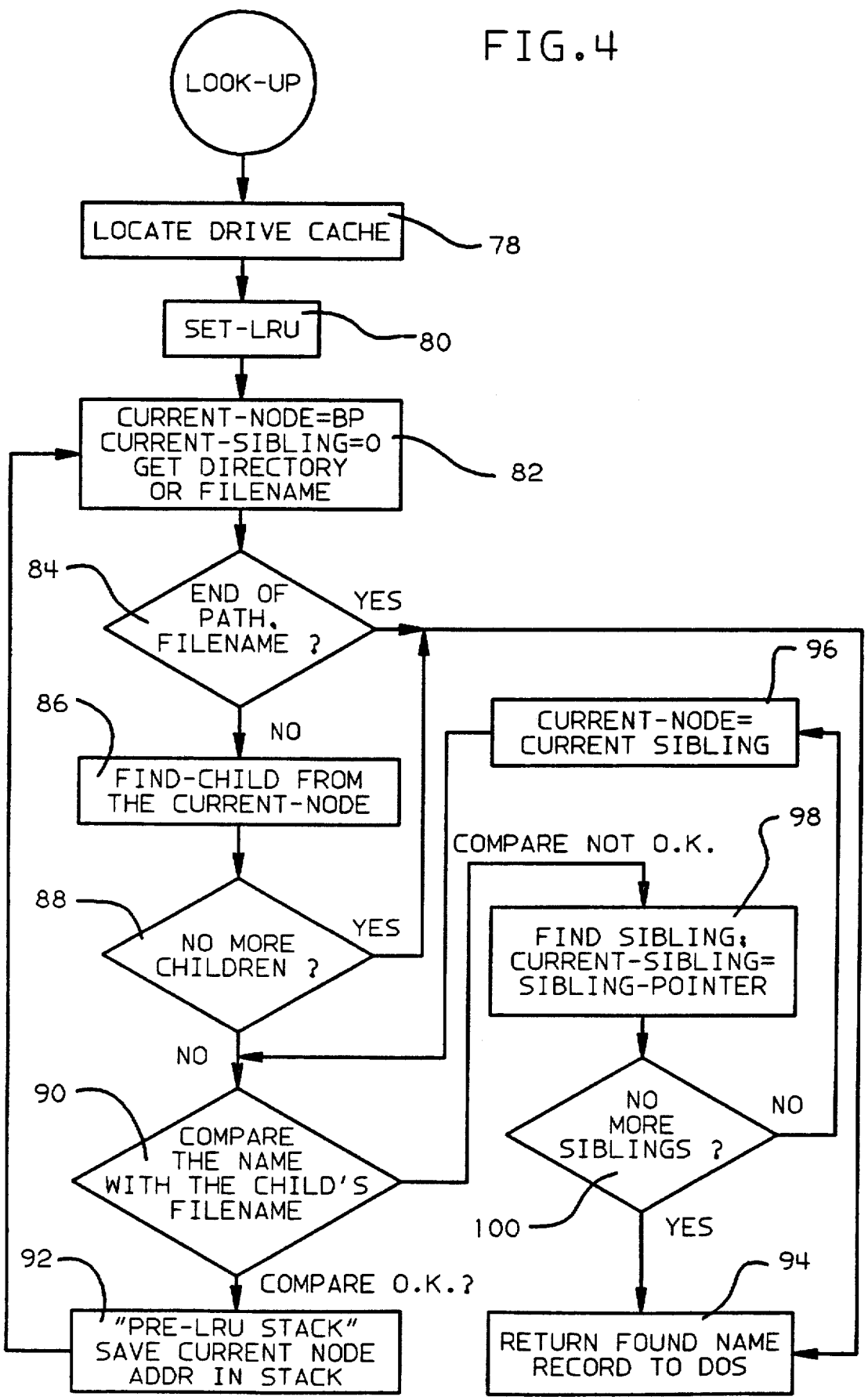
FIG. 4 is a flow chart of the look-up procedure.

Referring now to FIG. 4, in accordance with the look-up procedures, step 78 first locates the cache 30 associated with the requested drive. Step 80 then sets the LRU chain from the pre-LRU stack. This stack is a logical stack used to keep the tree structured subdirectory while maintaining the LRU chain. Next, step 82 forms the start of a loop in which the current node is a pointer and it is initially set to point to the drive header and thereafter is then set to point to the current node entry. Current-sibling is set to zero and the directory or filename is looked at. The end of path or filename is determined by encountering the ASCII value zero and step 84 then decides if it has been reached. If it has not, which would be the usual instance when a search first begins, then step 86, using the pointer to the child from the current entry, would then find a child entry from the current mode. Step 88 looks to see if there are anymore children. That is, is the entry the last child in the sequence. This fact would be indicated by a minus one in the child field. The desired name is then compared with the child filename. If such comparison as a result of step 90 is okay then, step 92 creates the pre-LRU stack, saves the current node address in the stack and branches back to step 82. The process continues until the filename is found at which the yes or positive determination from step 84 branches to step 94 and the record or information that is found is returned to DOS. If step 90 results in a negative determination, then step 98 looks at the pointer to the sibling field and by a loop initiating at step 100 going back through step 96, 90 and 98 would continue until no more siblings are left at which time the loop initiating at step 100 goes to step 94 which returns to DOS. When returning to DOS, FASTOPEN will set the pointer up to the directory or filename found in the path/filename string provided by DOS. DOS, in turn, will look at the pointer to determine whether the whole path has been found, or if only a partial path has been found or if it found nothing. When there are more siblings, step 96 sets the current node pointer to the current sibling.

Figure 5:
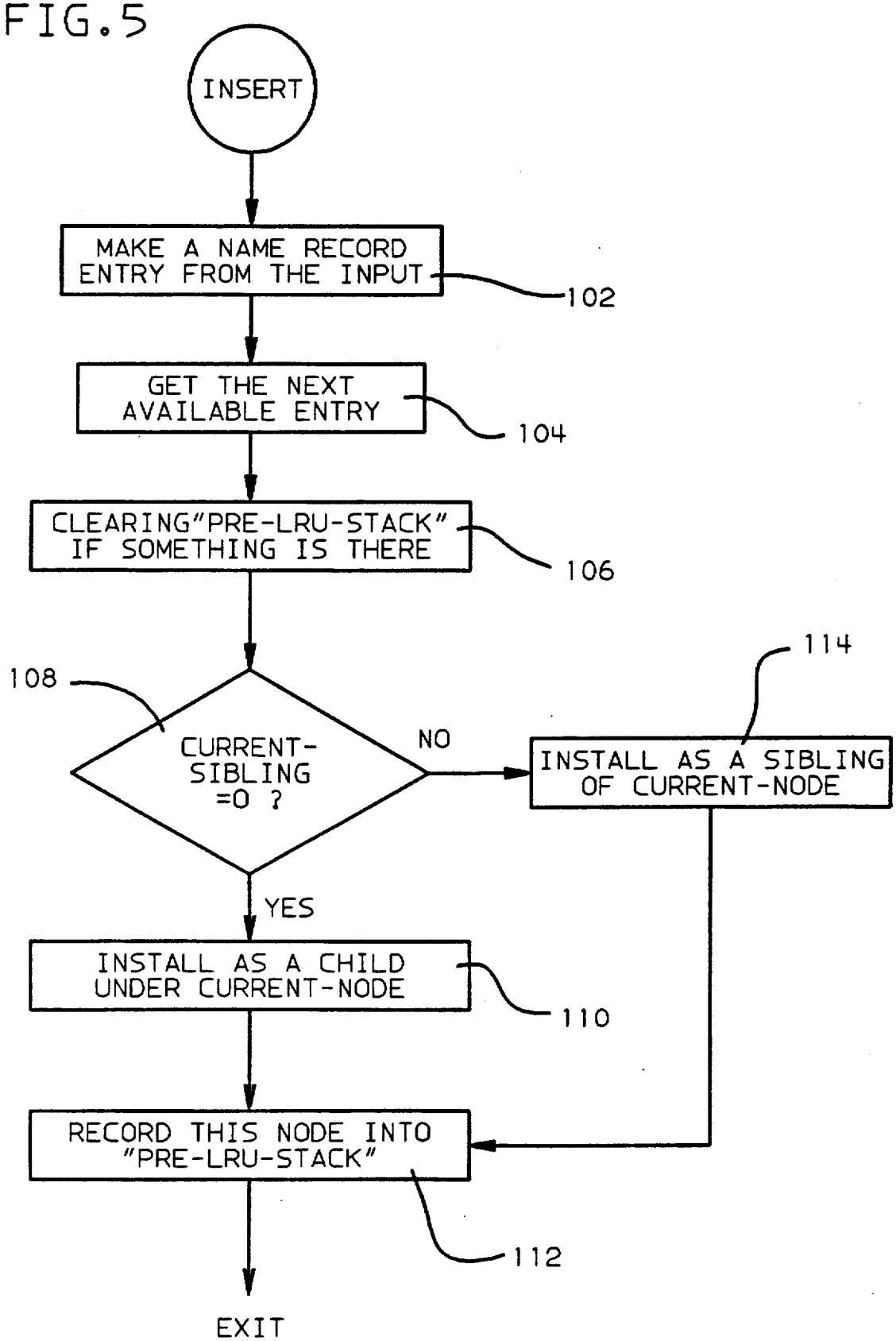
FIG. 5 is a flow chart of the insert procedure.

Referring to FIG. 5, the purpose of the insert procedure is to insert directory or file information as an entry in the cache, based on the current node and current sibling information. Step 102 makes a name record entry from the input and step 104 gets the next available entry. Until the cache is filled, a new entry would simply be put into whatever location or entry is free. Once the cache is filled, then the least recently used entry based upon the LRU list, would then be the next available entry to be replaced by the newer one. Step 106 clears the pre-LRU stack to the extent anything is there. If the current sibling pointer is equal to zero, then the new entry is installed by step 110 as a child under the current node and step 112 records such node in the pre-LRU stack. If a current sibling in step 108 is not equal to zero, then step 114 installs the new entry as a sibling of the current node.

Figure 6:
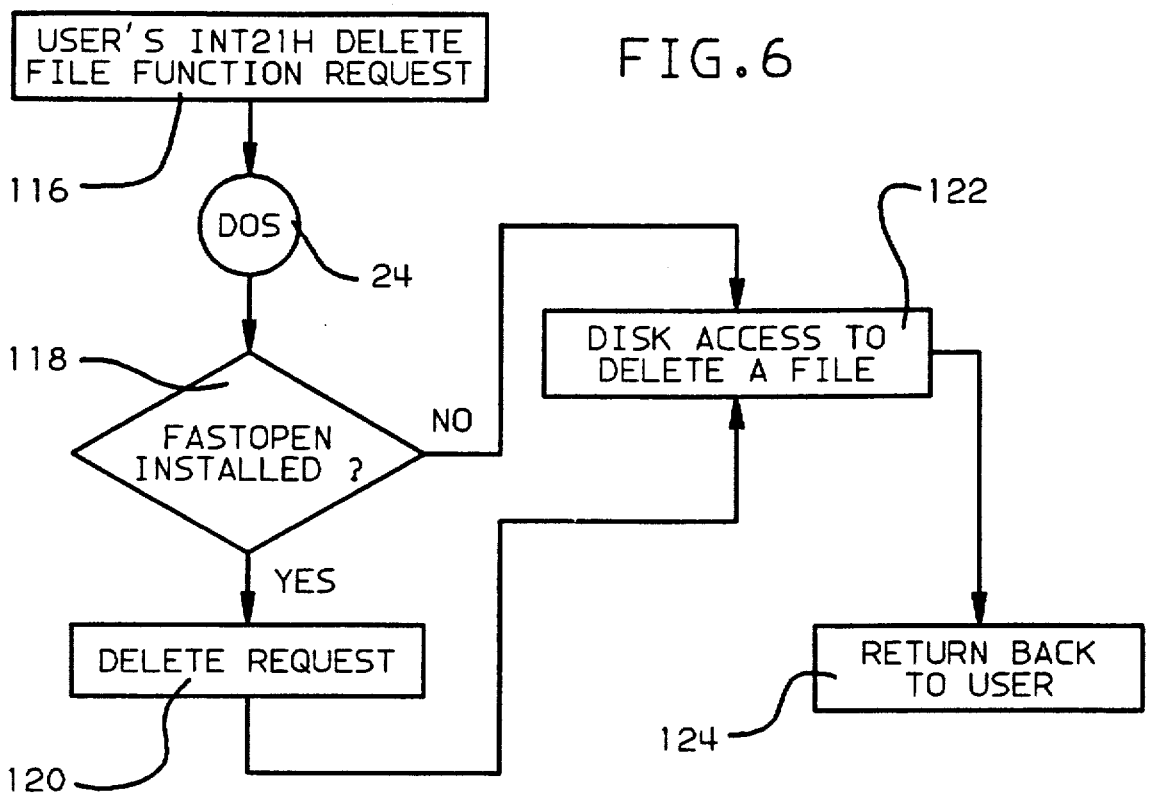
FIG. 6 is a flow chart of the delete request procedure.
Figure 7:
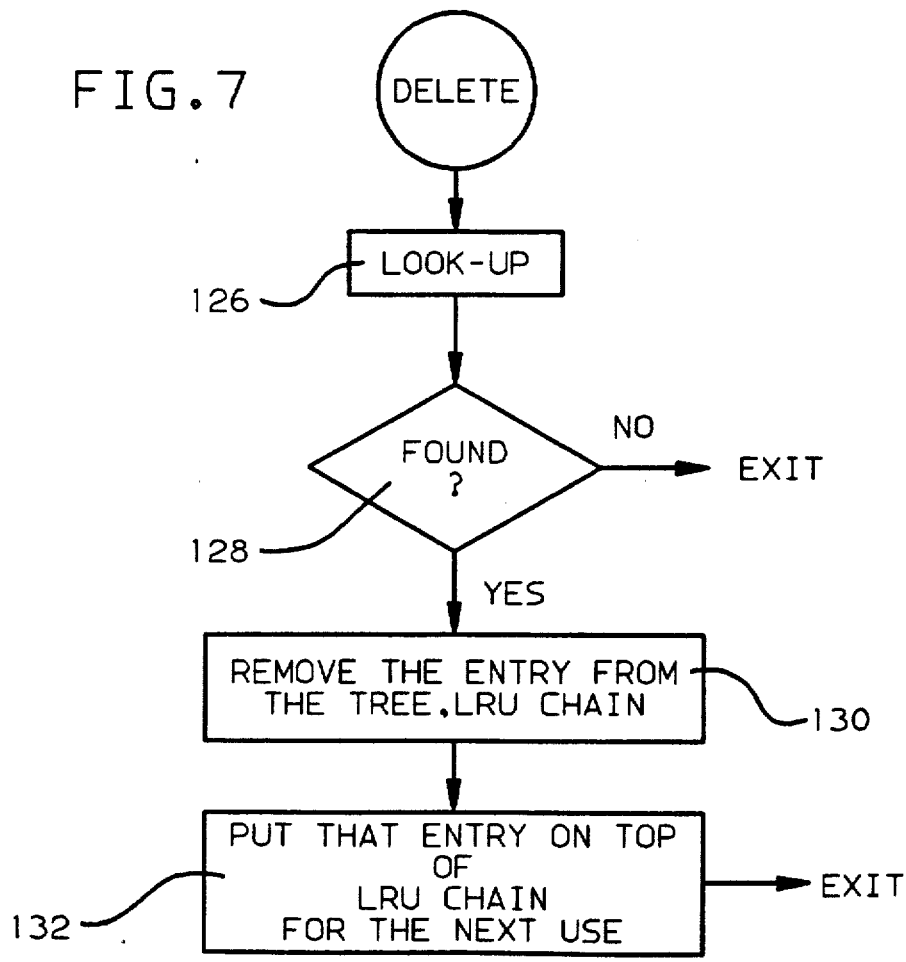
FIG. 7 is a flow chart of the delete procedure.

Referring now to FIGS. 6 and 7, when an application or user requests that a particular file be deleted, a procedure not only deletes the file in the disk in usual fashion but also deletes any corresponding entries in the cache. Thus, in response to the user request in step 116, the process passes through DOS 24 and step 118 decides whether FASTOPEN has been installed. If not, step 122 accesses the disk and deletes the file after which step 124 returns to the user. If FASTOPEN is installed, then the delete request 120 is made. In response to such request, step 126 looks up the cache to determine whether or not there is a corresponding entry. If no entry is found at step 128 the procedure is simply exited. If the entry is found at step 128, it is removed from the tree structured LRU chain by step 132 and that particular entry is put on the top of the LRU chain by step 132 as being available for use by a new entry. A file entry is first deleted and then any parent directories that do not contain any child or sibling pointers.

Figure 8:
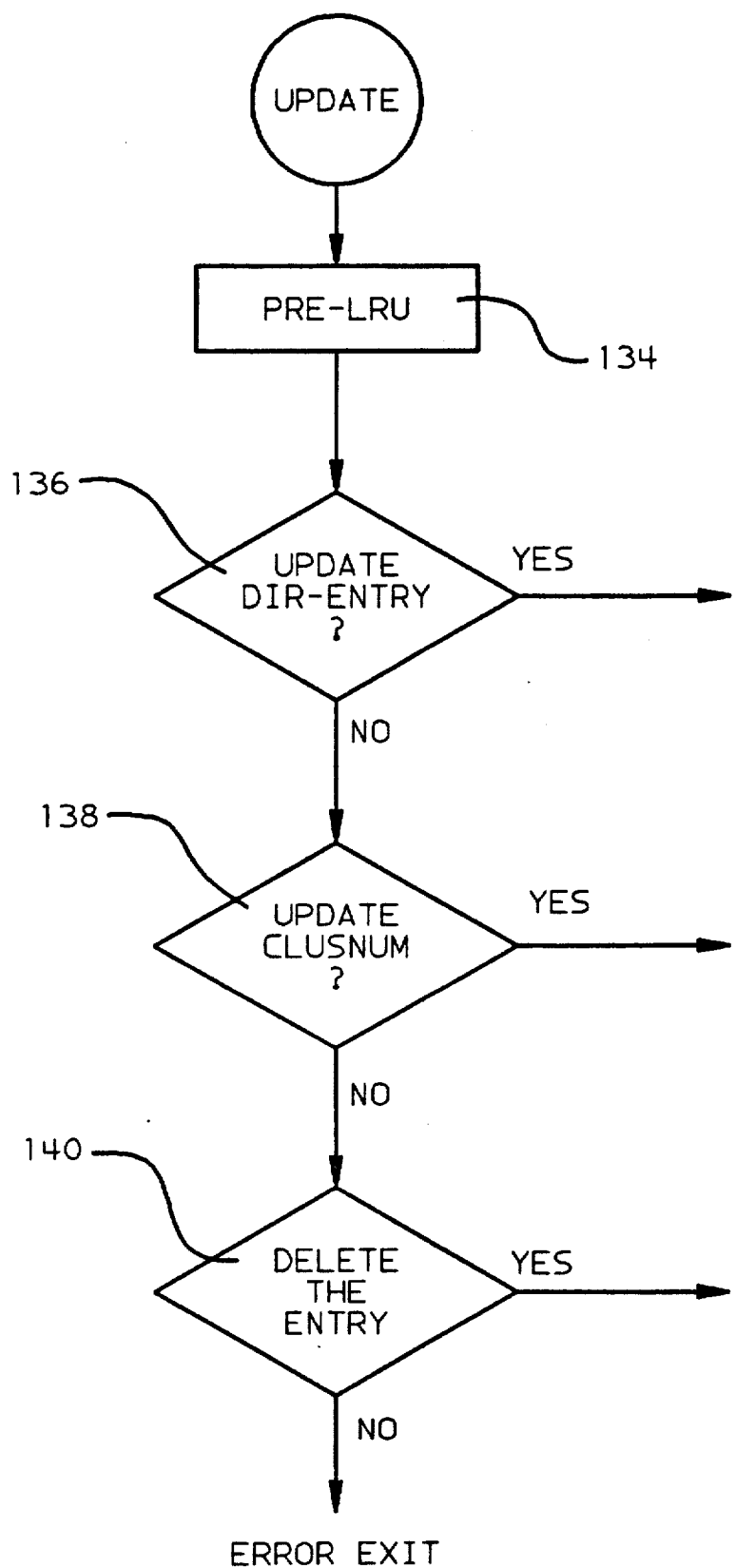
FIG. 8 is a flow chart of the update procedure.
Figure 9:
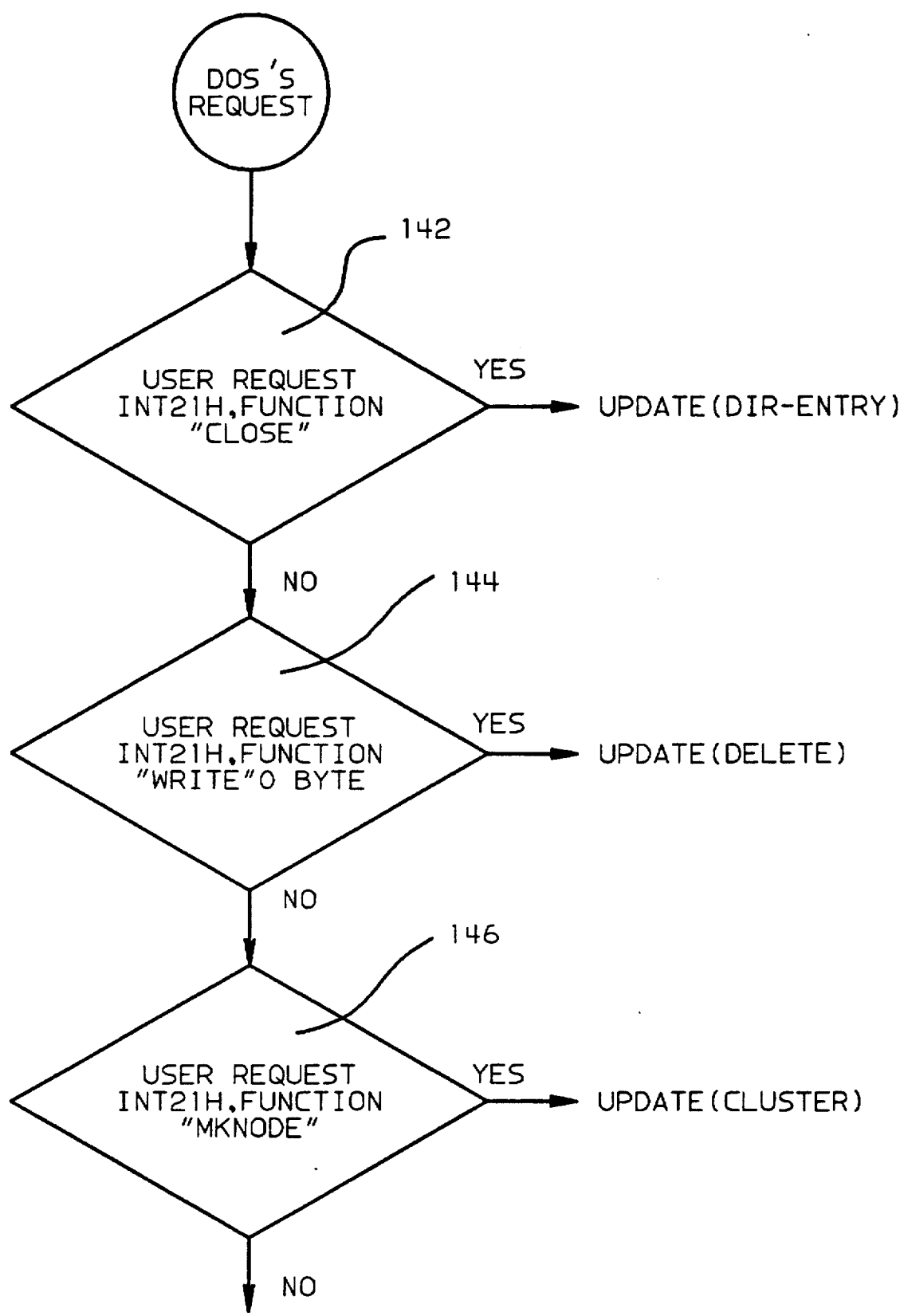
FIG. 9 is a flow chart of how DOS can invoke certain procedures of the invention.

Referring now to FIGS. 8 and 9, there are certain functions built into the FASTOPEN procedures that can be invoked directly by DOS for accomplishing certain functions ancillary to functions that DOS provides. The DOS requests are ancillary to the functions of closing a file, writing zero bytes in a file or making a node and steps 142, 144 and 146 respectively determine whether such functions are requested and then branch to the update steps of 134–140. The positive results from steps 136–140 respectively update a directory entry, update a cluster number associated with a file and delete an entry.

In the foregoing discussion, mention was made of the pre-LRU stack and this will now be explained relative to the LRU stack, both of which involve the use of the LRU and MRU pointers in the entries. As the process steps through a path, it goes from the root directory and through any sub-directories until it reaches the filename and a pre-LRU stack is made in accordance with the order in which the various nodes are accessed. Thus, in an example of a file accessed or specified by C:/DIR1/DIR2/FILE1, the order of entries is the root directory, DIR1, DIR2 and FILE1. This ordering creates a problem to the extent that the root directory would be the least recently used entry and should such entry be deleted for replacement, then access to the remaining entries would be cut off. This problem is avoided by using the pre-LRU stack and re-ordering the entries, once the path is set up, to create an LRU stack in which the filename would appear to be the least recently used entry and therefore on replacement, it would be the filename and not any of the parent directories that would be initially replaced.

It should be apparent to those skilled in the art that other changes and modifications can be made without departing from the spirit and scope of the invention as defined in the appended claims.

What we claim as new and desire to secure by Letters Patent is:

1. A method of operating a personal computer system having a first disk drive including a first disk in which is stored a tree structure of directories and files, said directories and said files being stored in different clusters on said disk, each directory containing a list of directory entries identifying files and directories stored therein, each directory entry for a directory containing information including a directory name and starting cluster where such directory is stored on said disk, each directory entry for a file containing information including a file name and starting cluster where such file is stored on said disk, said data processing system further comprising a main memory for storing data, said data stored in said memory being accessible at a rate substantially faster than the rate at which data stored on said disk can be accessed, said method comprising the steps of:
   (a) creating in said main memory a first cache containing a predetermined number of cache entries for storing a history of paths to most recently used files in said disk drive, said cache entries including one cache entry for each file and one cache entry for each directory to such file, a cache entry for a directory containing the directory entry for such directory, a cache entry for a file containing the directory entry for such file;
   (b) in response to an initial request to open a given file nested in a path of directories where such request identifies said given file by its file name and each of said directories in said path by their directory names, accessing said disk at least once for each directory and at least once for said given file and reading from said disk the directory entries corresponding to said given file and to each directory in said path to said given file;
   (c) storing said directory entries read in step (b) in cache entries in said cache and forming a chain to create a history of said path to said given file;

(d) in response to a subsequent request to open said given file, searching through said cache entries in said chain to locate said directory entry therein for said given file; and (e) opening said given file by using said directory entry located in step (d).

2. A method in accordance with claim 1 comprising:

(f) creating in step (a) a cache header containing information identifying said disk drive;

(g) including in said subsequent request to open said given file information identifying said disk drive; and said step (d) includes first comparing said information identifying said disk drive in both said drive header and said subsequent request before searching through said cache entries.

3. A method in accordance with claim 1 wherein said personal computer system includes a plurality of disk drives each including a disk, each disk drive having a different drive ID, comprising:

creating a plurality of caches in said main memory, including said cache created in step (a) there being one cache for each disk drive, each cache including a cache header in which is stored the drive ID of the associated disk drive; and including in requests to open files the drive IDs in which such files are located;

and, in response to such requests from the preceding step searching through said cache headers to locate the caches containing entries for the files to be opened.

4. A method in accordance with claim 1 further comprising:

in said step (a), providing a cache of a size for containing a predetermined number of entries;

(f) in response to a plurality of requests for opening a plurality of different files, filling said cache with entries associated with said different files;

(g) storing in said cache a history of file usage which history indicates which file is least recently used; and (h) thereafter, in response to a request to open an additional file, deleting entries associated with said least recently used file and adding entries associated with said additional file.

5. A method in accordance with claim 1 comprising: in response to a third request to open a second given file identified by a path which includes certain directories the same as some of the directories in the path of said first mentioned given file, searching through said entries in said cache corresponding to the common directories and thereafter reading from said disk such further information as is necessary to form a complete path to said second given file.

6. A method in accordance with claim 5 comprising: creating new entries from said further information and adding said new entries to said cache to form therein a complete path of entries for said second given file.

7. A method of operating a personal computer having at least one disk drive containing a disk in which said first file is located in a tree structure of directories, said directories and said first file being stored in different locations on said disk, each directory having a plurality of directory entries specifying names and locations on said disk of each file and each other directory stored in such each directory, there being a first directory entry in one of said directories containing the name and location of said first file, said personal computer system further comprising a main memory in which data stored therein is accessible at rates substantially faster than the rate at which data is accessible in said disk, said method comprising the steps of:

allocating a portion of said memory for storing a plurality of records;

requesting that said first file be opened and identifying said first file by specifying its filename and the name of each directory in a first path through said tree structure leading to said first directory entry;

opening said first file by steps including accessing said disk at least once for each directory in said first path, and searching through each directory in said first path to locate said first directory entry;

and storing in said records in said memory the directory entries for said directories in said first path and said first directory entry for said first file, such directory entries being read while accessing said disk in the preceding step.

8. A method in accordance with claim 7 further comprising:

subsequently opening said first file by searching through said records including said directory entries stored therein and locating said first directory entry in said first record, to thereby eliminate the need to access said disk drive to obtain such first directory entry therefrom.

9. A method in accordance with claim 8 comprising: subsequently opening a second file stored on said disk in said tree structure wherein said second file has a second path thereto which includes one or more directories included in said first path, one of said directories in said second path containing a second directory entry including the name and location of said second file, by first searching through said chain of records in said memory for records corresponding to said directories in both of said paths, and accessing said disk to locate any remaining directory in said second path and said second directory entry.

10. A method in accordance with claim 9 comprising: storing in said records directory entries corresponding to said second file and to any directory in said second path not included in said first path.

* * * * *